US009292089B1

(12) United States Patent
Sadek

(10) Patent No.: US 9,292,089 B1
(45) Date of Patent: Mar. 22, 2016

(54) GESTURAL OBJECT SELECTION

(75) Inventor: Ramy S. Sadek, Mountainview, CA (US)

(73) Assignee: Amazon Technologies, Inc., Seattle, WA (US)

( * ) Notice: Subject to any disclaimer, the term of this patent is extended or adjusted under 35 U.S.C. 154(b) by 714 days.

(21) Appl. No.: 13/216,953

(22) Filed: Aug. 24, 2011

(51) Int. Cl.
*G09G 5/00* (2006.01)
*G06F 3/01* (2006.01)

(52) U.S. Cl.
CPC .............. *G06F 3/016* (2013.01); *G06F 3/011* (2013.01)

(58) Field of Classification Search
USPC ............. 345/156, 207, 419; 382/103; 463/36
See application file for complete search history.

(56) References Cited

U.S. PATENT DOCUMENTS

| 6,157,382 | A * | 12/2000 | Ohshima et al. .............. 345/419 |
| 6,437,794 | B1 * | 8/2002 | Ohshima et al. .............. 345/619 |
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 8,342,963 | B2 * | 1/2013 | Steiner et al. .................. 463/36 |
| 2011/0221658 | A1 * | 9/2011 | Haddick et al. ................... 345/8 |
| 2012/0155705 | A1 * | 6/2012 | Latta et al. ..................... 382/103 |
| 2012/0223885 | A1 | 9/2012 | Perez |
| 2012/0309532 | A1 * | 12/2012 | Ambrus et al. ................. 463/36 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Dwayne Bost
*Assistant Examiner* — Robert Michaud
(74) *Attorney, Agent, or Firm* — Lee & Hayes, PLLC

(57) ABSTRACT

A posture for a user is derived and used in conjunction with a known physical location of a tangible object or a presented virtual object to determine when the user selects at least a portion of the object. The derived posture comprises a model having a user origin and a gestural terminus, from which a designation vector intersecting with the selected object is determined. The designation vector may extend from a user origin of the dominant eye through a gestural terminus comprising a tip of an outstretched finger. For example, the user may point to a chair in the room to select the physical chair, or point to a picture of a chair presented via a display device to select the picture.

28 Claims, 12 Drawing Sheets

GESTURAL OBJECT SELECTION

BACKGROUND

Augmented reality allows interaction among users and real-world tangible objects and virtual or computer-generated objects and information within an augmented reality environment. Within the augmented reality environment, interactions may include electronic input, verbal input, physical input relating to the manipulation of tangible and virtual objects, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
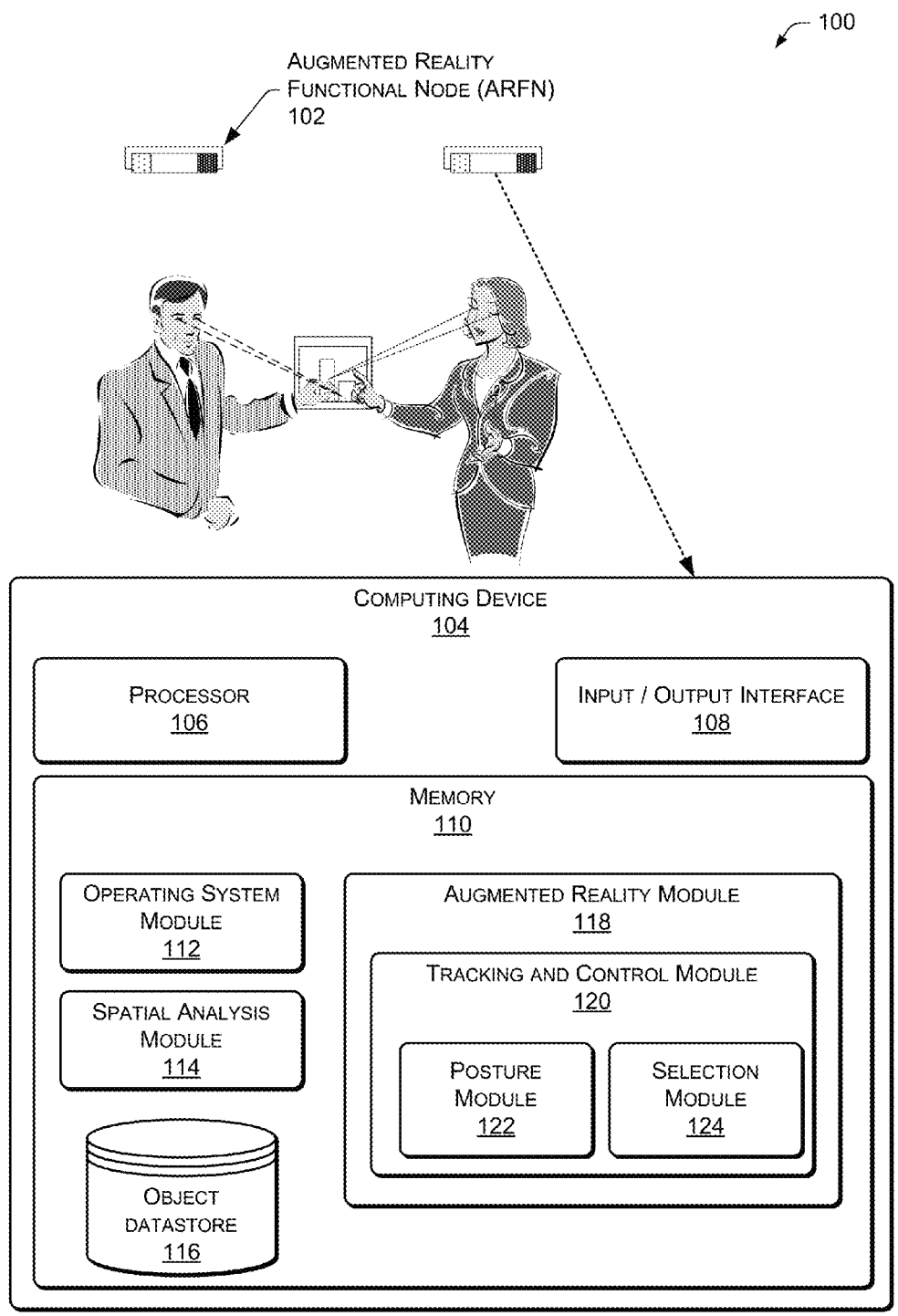
FIG. 1 shows an illustrative scene within an augmented reality environment that includes an augmented reality functional node with associated computing device and a tracking and control module configured to provide gestural object selection.

An augmented reality system may be configured to provide for interactions between objects such as tangible real-world objects and presented virtual objects. The augmented reality system may be configured to accept gestural input. Gestural input is a natural communication mode for humans. For example, one person referring another person to a restaurant across the street is likely to point in the direction of the restaurant. Gestures such as pointing, grasping, sweeping an arm, and so forth may be used as inputs within the augmented reality environment.

Disclosed herein are techniques and devices suitable for gestural object selection whereby a particular object or portion thereof is indicated by a gesture. For example, a user may point to a virtual object such as a photograph presented via a display device to select that particular photograph. As described herein, the particular object or portion thereof is selected by determining a designation vector based at least in part upon a derived posture of the user. The derived posture may include a user origin, a gestural terminus, location of the object, and in some implementations the orientation of the gestural terminus.

The user origin is a reference point or volumetric location associated with the physicality of a user. For example, in some implementations the user origin may be the spatial location (e.g., in X-Y-Z space) of the dominant eyeball. The user origin and its designation are discussed below in more detail.

The gestural terminus is one or more spatial points or volumetric locations associated with where a gesturing appendage of the user or tool ends. For example, the gestural terminus of a user pointing with an index finger is the tip of their extended finger. While a single gestural terminus is described herein, it is understood that a gestural input may include a plurality of gestural termini, such as when two hands are involved, multiple fingers, head and hand, and so forth. The gestural terminus is also discussed below in more detail.

The designation vector exists relative to the user origin and the gestural terminus. This vector includes a direction as well as a magnitude. The magnitude may be proportionate to a distance between the user origin and the gestural terminus. Orientation of the gestural terminus or other factors may also affect the magnitude of the designation vector.

By determining the designation vector and determining where that vector corresponds with an object or a portion thereof, the user may select or otherwise interact with that object in the augmented reality environment. For example, the user may point with palm-up to a displayed picture of a chair presented by a display device. The designation vector intersects the image of the chair, while the magnitude of the vector in response to the gestural orientation may be such that the selection is of the opposite and unseen side of the chair. Upon selection, the displayed image of the chair may be changed to show the previously hidden back of the chair.

ILLUSTRATIVE ENVIRONMENT

FIG. 1 shows an illustrative augmented reality environment 100 that includes an augmented reality functional node (ARFN) 102 with associated computing device. One or more ARFNs 102 may be positioned on the ceiling of the room. In other implementations, the ARFN 102(s) may be positioned in other locations within the scene, such as on walls, in lamp fixtures, on tables, and so forth. When active, the ARFN 102 may generate an augmented reality environment incorporating the scene. In some implementations, more or fewer ARFNs 102 may be used.

The ARFN 102 is coupled to a computing device 104. This computing device 104 may be within the ARFN 102, or disposed at another location and connected to the ARFN 102. The computing device 104 comprises a processor 106, an input/output interface 108, and a memory 110. The processor 106 may comprise one or more processors configured to execute instructions. The instructions may be stored in memory 110, or in other memory accessible to the processor 106.

The input/output interface 108 may be configured to couple the computing device 104 to other components such as projector, cameras, microphones, other ARFNs 102, other computing devices, and so forth. The coupling between the computing device 104 and the devices may be via wire, fiber optic cable, or wireless connection.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 110 and configured to execute on a processor, such as the processor 106. An operating system module 112 is configured to manage hardware and services within and coupled to the computing device 104 for the benefit of other modules. Modules may be stored in the memory of the ARFN 102, storage devices accessible on the local network, or cloud storage accessible via a wide area network.

A spatial analysis module 114 is configured to perform several functions which may include analyzing a scene to generate a topology, recognizing objects in the scene, dimensioning the objects, modeling the scene, and so forth. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. The spatial analysis module 114 may receive data from input and output components, such as described below with regards to FIG. 2.

An object datastore 116 in the memory 110 is configured to maintain information about objects within the scene. This information may be acquired from the ARFN 102, other input devices, or via manual input. For example, the object datastore may include surface contours of the object. The object datastore 118 may include a library of pre-loaded reference objects or physiological models of users. These models are discussed in more detail below with regards to the posture module 122. The object datastore 118 may be stored on one or more of the memory of the ARFN 102, storage devices accessible on the local network, or cloud storage accessible via a wide area network. As used in this disclosure, datastore includes lists, arrays, databases, and other data structures used to provide storage and retrieval of data.

An augmented reality module 118 is configured to generate augmented reality output in concert with the physical environment. A tracking and control module 120 may be configured to identify objects within the scene and track their position and, in some implementations, orientation. The augmented reality module 118 may access input/output devices within one or more ARFN nodes 102 to generate output, receive input, or both.

The tracking and control module 122 is configured to identify objects within the scene, track their position, and accept gestures as inputs. The tracking and control module 122 may utilize data obtained by the spatial analysis module 114. The tracking and control module 122 may include a posture module 122 and a selection module 124.

The posture module 122 is configured to derive a posture of a user in the augmented reality environment. As used herein, posture refers to the physical arrangement of a user's body, such as arms, hands, legs, torso, head, and so forth. For example a user with right arm extended and right index finger extended is in one posture, while the user holding both hands over his head is in another posture. The posture module 122 is configured to accept data from the augmented reality environment and derive the posture of one or more users. In some implementations, the derived posture may comprise a simplified model of the human body's gross orientation and operational limits. The posture module 122 may be used to determine the position and placement of portions of the user's anatomy in space. For example, few users can touch a sole of their foot to the back of their head while standing. As a result, with the derived posture model, it is possible to assume that the user's appendage which is touching the back of that same user's head is likely a hand and remove otherwise incongruous results. The derived posture and its determination are discussed below in more detail with regards to FIG. 5.

A selection module 124 generates a designation vector and determines what object that vector corresponds to. The selection module 124 may use the derived posture from the posture module 122 and data from the spatial analysis module 114 to determine that a user is gesturing to select a particular object or portion of that object. The designation vector and the selection are discussed below in additional detail.

Figure 2:
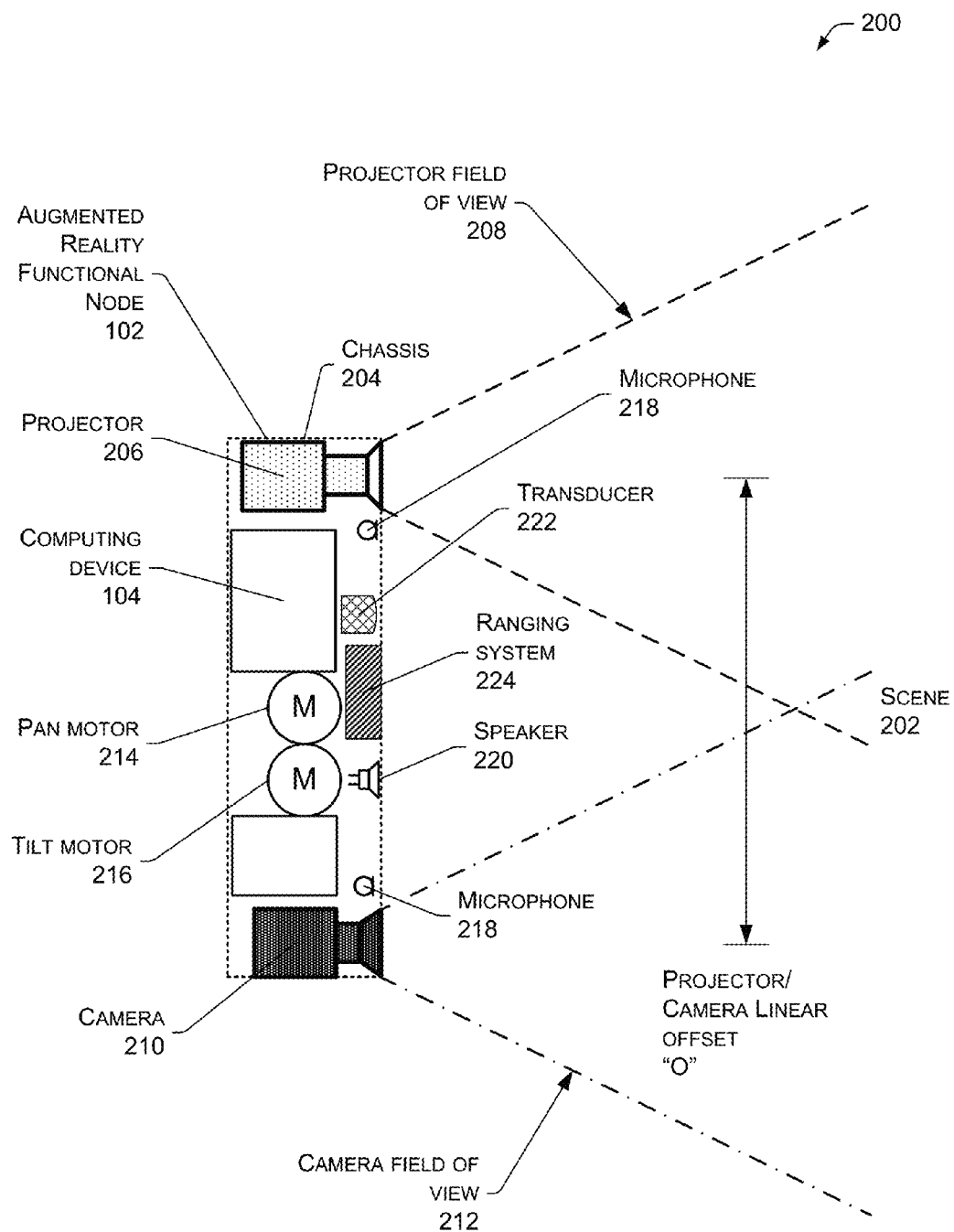
FIG. 2 shows an illustrative augmented reality functional node and selected components.

FIG. 2 shows an illustrative schematic 200 of the augmented reality functional node 102 and selected components. The ARFN node 102 is configured to scan at least a portion of a scene 202 and the objects therein. The ARFN 102 may also be configured to provide output.

A chassis 204 is configured to hold the components of the ARFN 102. Within the chassis may be disposed a projector 206. The projector 206 is configured to generate images. These images may be visible light images perceptible to the user, visible light images imperceptible to the user, images with non-visible light, or a combination thereof. This projector 206 may comprise a digital micromirror device (DMD), liquid crystal on silicon display (LCOS), liquid crystal display, 3LCD, and so forth configured to generate an image and project it onto a surface within the environment. In some implementations other display devices may be used in place of or in addition to the projector 206. These display devices may include emissive, reflective, or other display technologies suitable for presenting electronically generated visual information such as bitmaps, raster graphics, and so forth to a user.

The projector 206 has a projector field of view 208 which describes a particular solid angle. The projector field of view 208 may vary according to changes in the configuration of the projector. For example, the projector field of view 208 may narrow upon application of an optical zoom to the projector. In some implementations a plurality of projectors 206 may be used.

A camera 210 or other imager may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. The actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise such as a tap on a wall or snap of the fingers which are pre-designated as inputs within the augmented reality environment. The user may alternatively use voice commands.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 224 may also be provided in the ARFN 102. The ranging system 224 is configured to provide distance information from the ARFN 102 to a scanned object or set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations the components of the ARFN 102 may be distributed in one or more locations within the environment 100. As mentioned above, microphones 218 and speakers 220 may be distributed throughout the scene. The projector 206 and the camera 210 may also be located in separate chassis 204. The ARFN 102 may also include discrete portable signaling devices used by users to issue inputs. For example, these may be acoustic clickers (audible or ultrasonic), electronic signaling devices such as infrared emitters, radio transmitters, and so forth.

Figure 3:
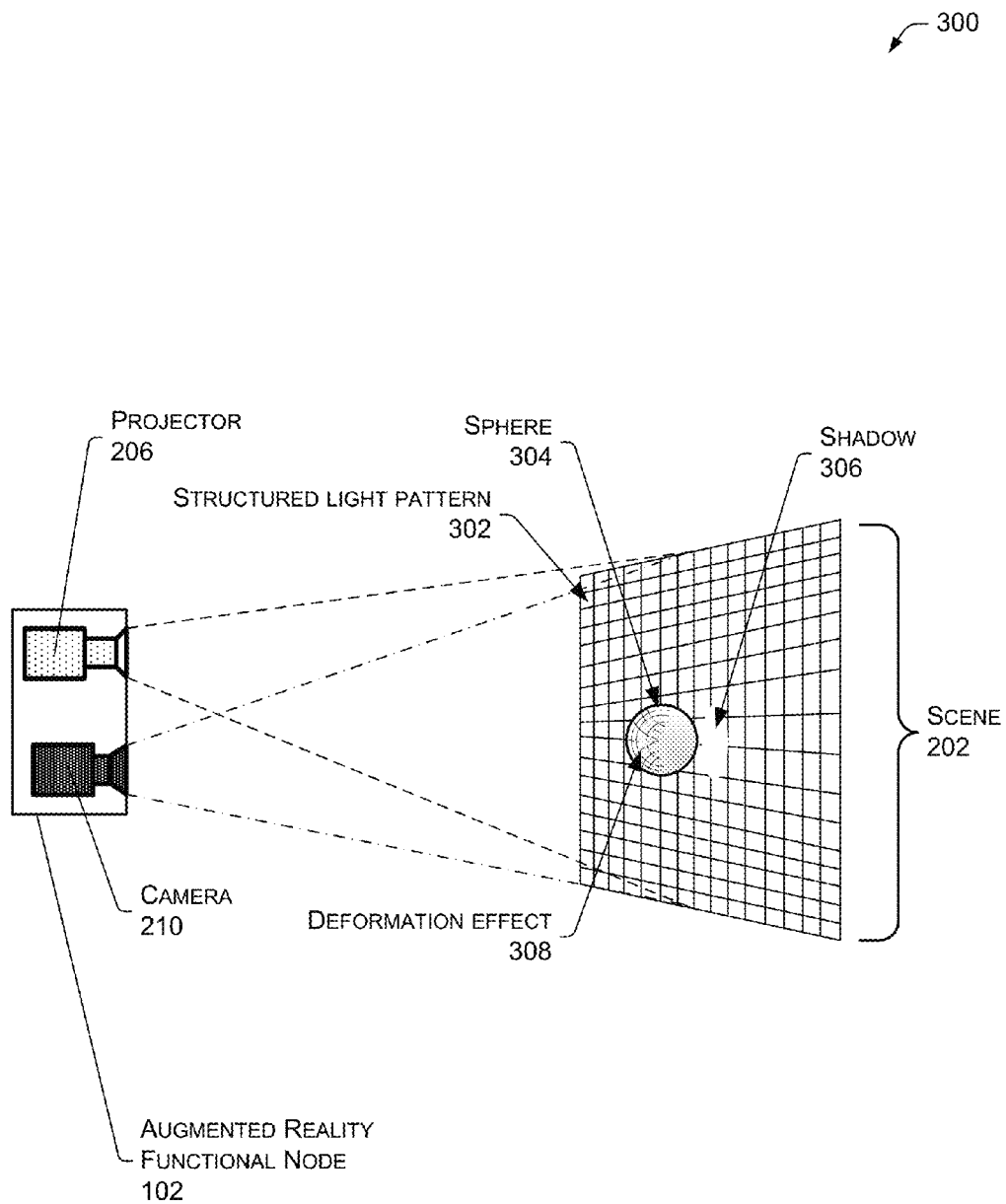
FIG. 3 illustrates the augmented reality functional node projecting a structured light pattern on a scene and receiving a corresponding image of the scene.

FIG. 3 illustrates a structured light pattern 300 impinging on the scene. In this illustration, the projector 206 within the ARFN 102 projects a structured light pattern 302 onto the scene 202. In some implementations a sequence of different structured light patterns 302 may be used. This structured light pattern 302 may be in wavelengths which are visible to the user, non-visible to the user, or a combination thereof. The structured light pattern 304 is shown in this example, but not by way of limitation, as a grid. In other implementations other patterns, such as bars, dots, pseudorandom noise, and so forth may be used. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

A sphere 304 is shown positioned between the projector 206 and a wall in the scene 202. A shadow 306 from the sphere 304 appears on the wall. Inspection of the sphere 304 shows a deformation effect 308 of the structured light pattern 302 as it interacts with the curved surface of the sphere 304.

In some implementations other effects, such as dispersion of the structured light pattern 302 may be used to provide information on the topography of the scene. Where the projector 206 and camera 210 have differing fields of view, such as shown in FIG. 2, the dispersion or change in the "density" of the structured light pattern 302 may be used to determine depth of field.

The camera 210 detects the interaction of the structured light pattern 302 with objects within the scene. For example, the deformation effect 308 on the sphere 304 is detected by the camera 210. The camera 210 is configured to sense or detect the structured light. In some implementations the camera 210 may also sense or detect wavelengths other than those used for structured light pattern 302. The image captured by the camera 210 is processed by the spatial analysis module 114 to characterize the scene 202. In some implementations, multiple cameras may be used to acquire the image.

Illustrative Scene

Figure 4:
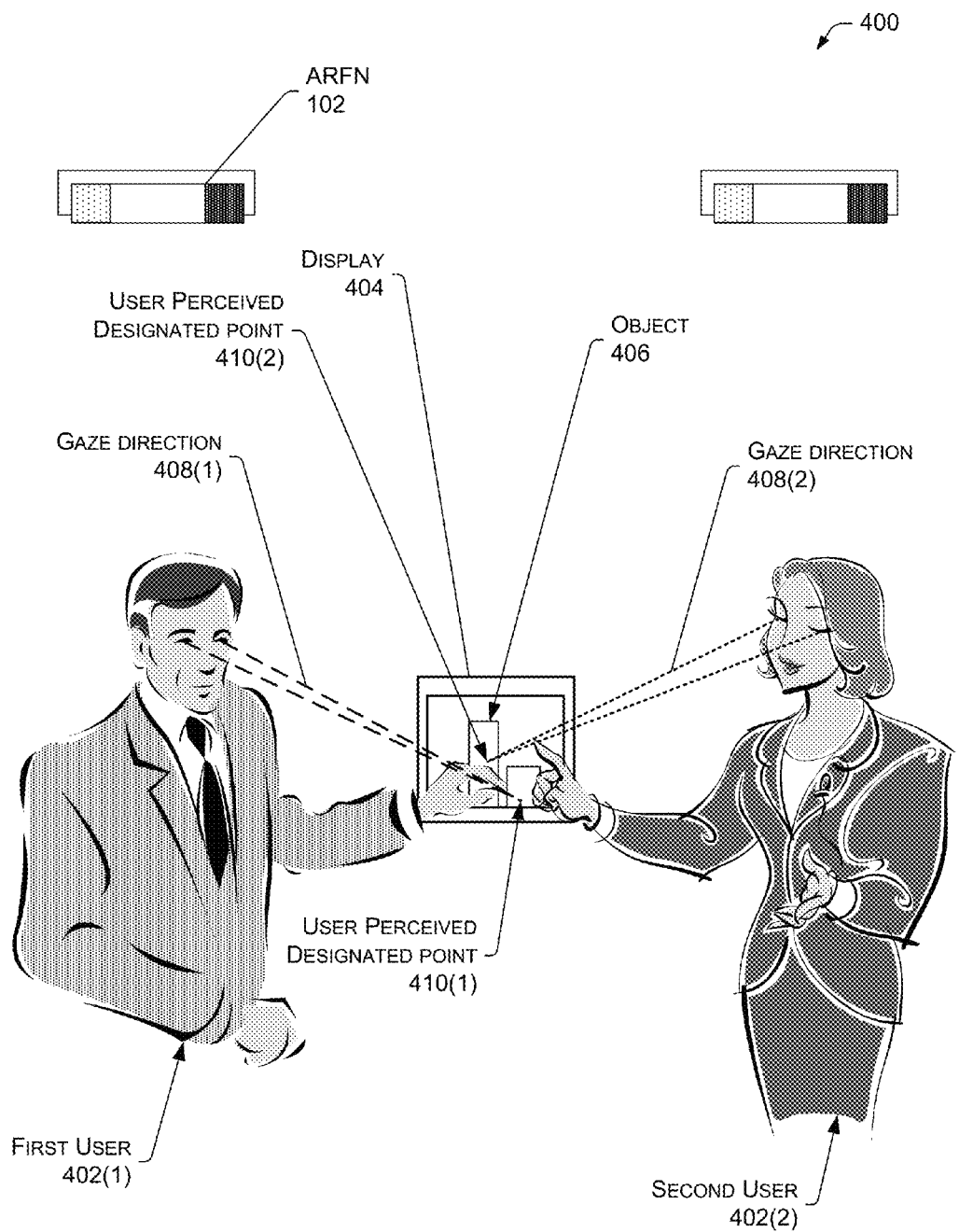
FIG. 4 illustrates a scene with two users interacting with virtual objects presented via a display device.

FIG. 4 illustrates a scene 400 with two users in an augmented reality environment, such as maintained at least in part by one or more of the ARFNs 102. A first user 402(1) is shown in a discussion with a second user 402(2). A display 404 is shown. This display 404 may be provided by a display device such as a projector 206, emissive display, reflective display, and so forth. The display 404 may be configured to present a two- or three-dimensional image. For example, the display 404 may comprise a liquid crystal display, light emitting diode display, or image projected by one or more of the ARFNs 102. This image may be two-dimensional, or provide for stereoscopic three-dimensional viewing. In other implementations the display 404 may comprise a space filling three-dimensional display system.

Presented by the display 404 are several objects 406. In this and the following examples, the objects are virtual objects. However, the same techniques and devices described herein may be used to select tangible objects. The first user 402(1) is looking along a gaze direction 408(1) to a particular user-perceived designated point 410(1). The gaze direction 408 is the overall average direction of the user's central or foveal vision. Meanwhile the second user 402(2) is also looking along her gaze direction 408(2) to her user-perceived designated point 410(2). The user-perceived designated point 410 is the point the user associates with the particular gesture. The first user 402(1) is thus pointing to the rightmost object 406 presented on the display 404, while the second user 402(2) is pointing to the leftmost object 406 presented on the display 404.

Figure 5:
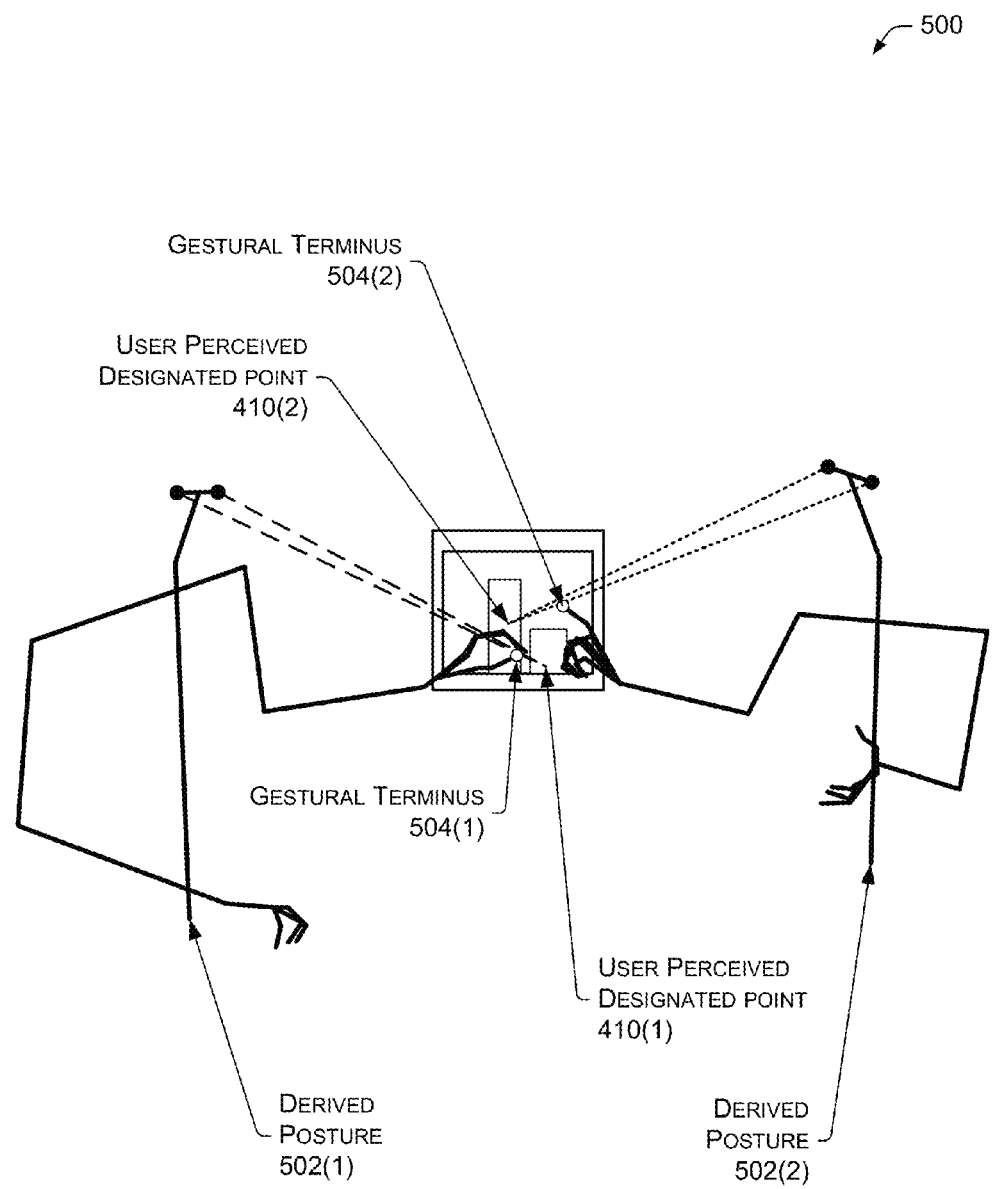
FIG. 5 illustrates derived postures for the two users of FIG. 4.

FIG. 5 illustrates derived postures 500 for the two users of FIG. 4. The ARFN 102 may be used to determine the spatial position and orientation of the users 402, as well as other physical objects in the scene. As described above, the spatial analysis module 114 may provide data to the posture module 122 which in turn generates derived postures for one or more users in the scene. In this illustration a derived posture 502(1) for the first user 402(1) is shown as well as a derived posture 502(2) for the second user 402(2).

The derived posture may comprise a simplified biomechanical model of the user's gross physiological makeup. For example, as shown here, the derived posture 502 reflects length, position, and orientation of the user's joints and extremities. In some implementations this may be visualized as a wireframe model of the users as shown here.

The derived posture 502 provides a simplified model which may be used in the augmented reality environment. For example, as shown here and discussed below in more detail, the position of a gestural terminus 504(1) (such as the fingertips of the left hand) of the first user 402(1) and a user origin such as the user's dominant eye may be used to determine the designation vector and determine the user-perceived designation point 410(1). The derived posture 502 also includes physiological constraints. For example, the user cannot detach a limb, and the user's arm reach extends to a definable maximum in relation to their shoulder. In another example, a user's wrist cannot rotate a complete 360 degrees. Such physiological constraints allow the environment to disregard contradictory or spurious input data, resolve ambiguities which may result from the scanning and user observation techniques in use, and improve the overall quality of the user interaction.

The derived posture 502 is a simplified model in that it is a less than comprehensive of the totality of the user and may omit details not used by the environment. For example, in one implementation as shown here, position of the user's jaw may not be a factor in the designation vector, and thus it is not a part of the derived posture 502. Generation of the derived posture is described in more detail below with regards to FIGS. 9-11.

One or more gestural termini 504 may be associated with the derived posture 502. For example, the gestural terminus 504(1) is volume where the user's thumb and index finger are proximate to one another, such as with the gesture of the first user 402(1) picking up the object 406. The gestural terminus 504(2) may also comprise a volume proximate to or encompassing the user's fingertip, such as the end of the second user's 402(2) right index finger which is extended. The gestural terminus 504 may in some implementations comprise a volume associated with a hand, arm, shoulder, head, foot, and so forth.

Figure 6:
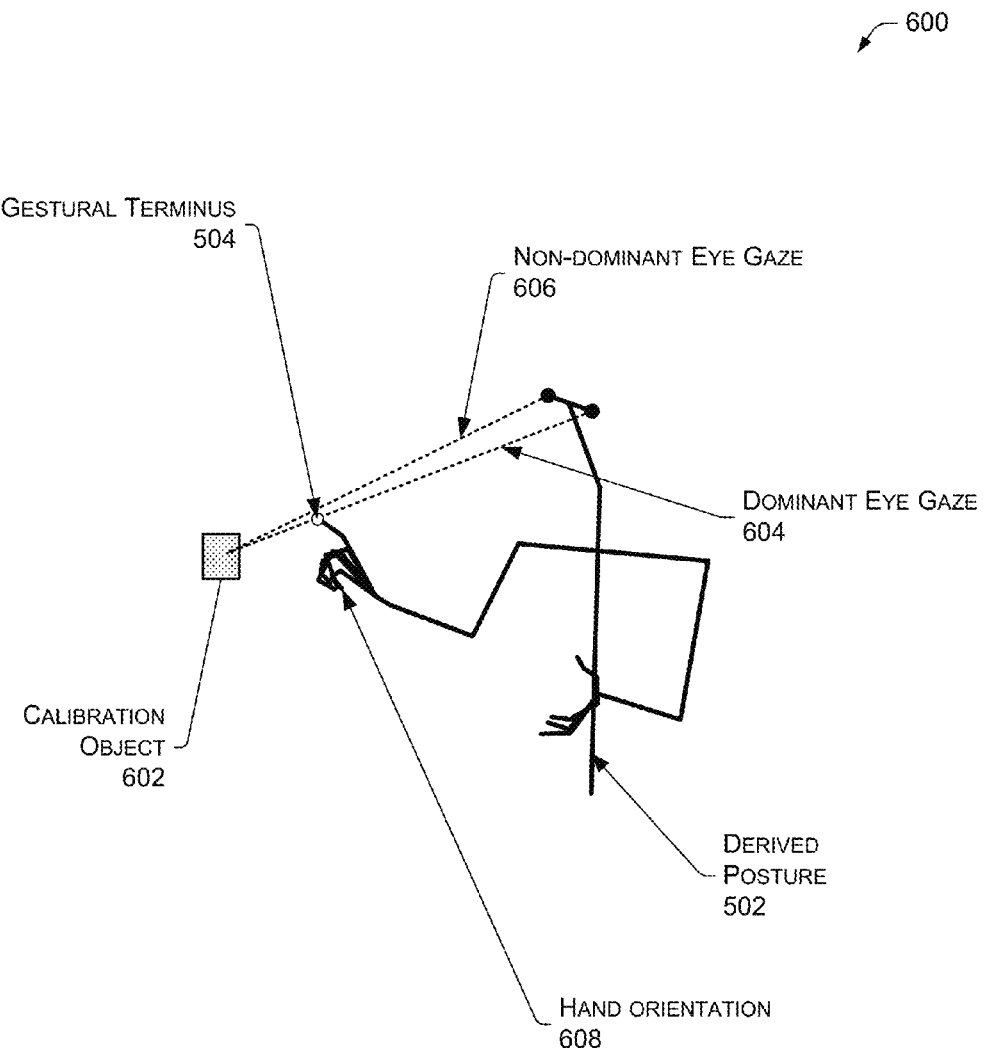
FIG. 6 illustrates a derived posture and calibration to determine dominant eye of the user.
Figure 6:
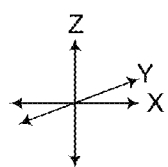

FIG. 6 illustrates a derived posture and calibration 600 configured to determine a dominant eye of the user. Humans have binocular vision resulting from two eyes which are placed a fixed distance apart. For relatively close objects, such as within about 10 meters, this binocular vision provides for depth perception. Because of the distance between the eyes, parallax effects occur, particularly for objects which are relatively close. Stated another way, each eye sees a different version of the same scene, shifted due to the linear distance between the eyes. This may be readily visualized by reaching out your hand to cover a distant object. By closing one eye and leaving the other open, then alternating, your hand appears to "jump".

In most of the human population, the human brain generally selects and uses a dominant eye. The dominant eye, or ocular dominance, is the tendency for the user's brain to prefer visual input from one eye over visual input from the other eye. Which eye is dominant may remain constant over the user's lifetime, or may vary depending upon the direction of the gaze, individual physiological variations, and so forth. As a result, eye dominance may be periodically re-assessed.

As shown in FIG. 6, the user is presented with a calibration object 602. The calibration object 602 has a known position relative to the derived posture 502. The user may be prompted to select this calibration object 602, or the calibration object 602 may be a commonly used control placed such that its selection is unambiguous regardless of eye dominance. As depicted here, the user is left eye dominant and has a dominant eye gaze 604 emanating from the left eye towards the calibration object 602. A non-dominant right eye provides a non-dominant eye gaze 606.

From the user's 402(2) point of view, she is reaching out the index finger of her right hand to select the calibration object 602. In fact, the gestural terminus 504 associated with that index finger is in the path of the dominant eye gaze 604. This presence in the gaze path may thus be used at least in part to determine eye dominance. Meanwhile, the non-dominant eye gaze 606 is unobscured. But, due to the user's eye dominance and perception, the index finger appears to be placed over the calibration object 602.

By determining the derived posture 502 including the location of the user's eyes, knowing the position of the gestural terminus 504, and the position of the calibration object 602, the environment may thus determine which eye is dominant. Such a determination may be used by the environment to generate the designation vector and determine what object or portion thereof has been selected.

Figure 7:
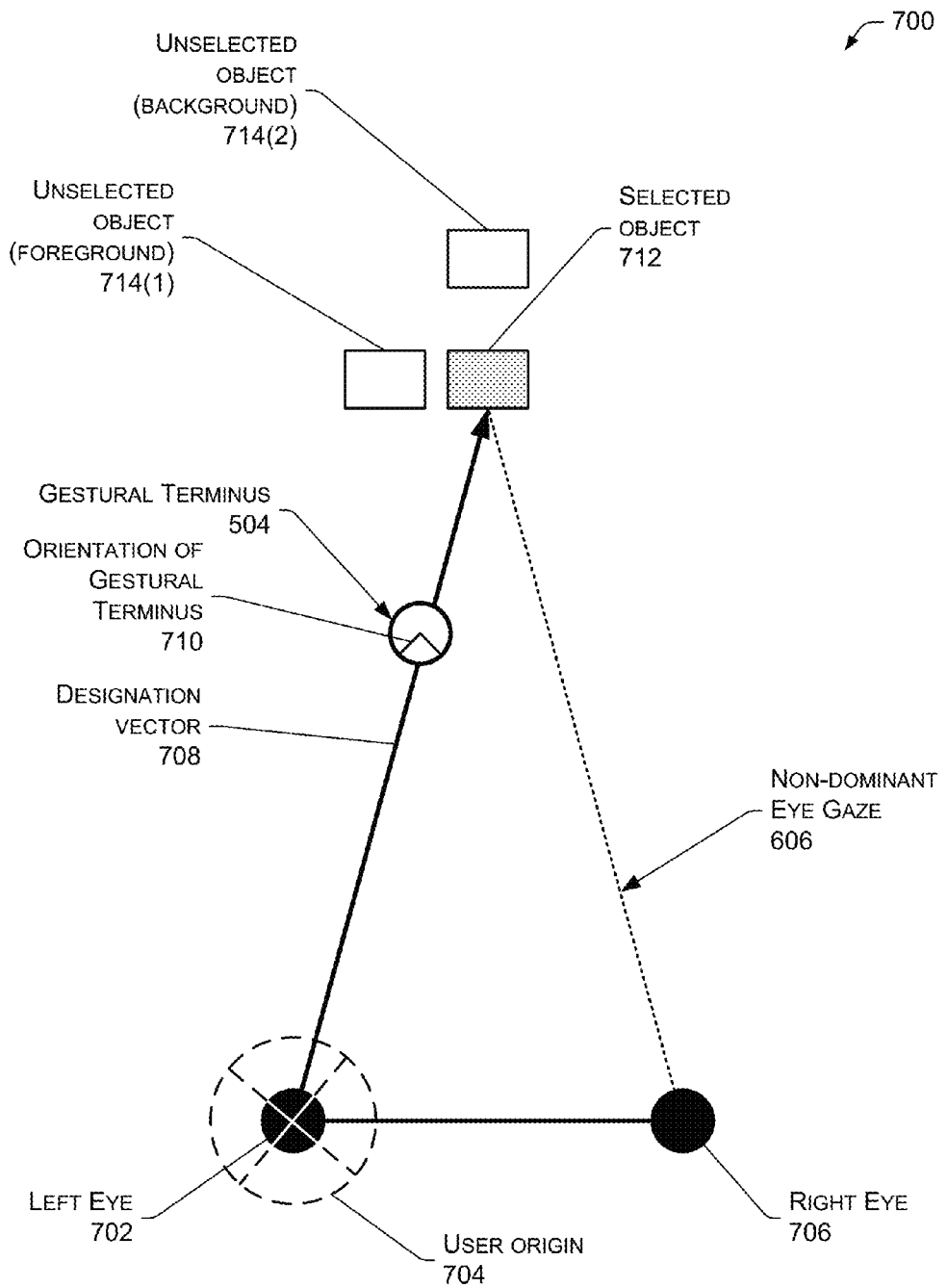
FIG. 7 is a plan-view illustration of the derived posture of a user and selection of a particular object.

FIG. 7 is a plan-view illustration 700 of the derived posture of a user and selection of a particular object. This view shows the eyes of the derived posture 502. For clarity of illustration and not by way of limitation, the remainder of the derived posture 502 has been omitted.

A left eye 702 is designated here as a user origin 704, which is centered on that eye. As mentioned above, the user origin is a reference point or volumetric location associated with the physicality of a user. The user origin may be part of the derived posture 502. For example, as shown here, the user origin 704 is the spatial location of the dominant (left) eyeball. Also shown is the right eye, 706 which is non-dominant in this illustration.

Shown here is a gestural terminus 504. The gestural terminus 504 in conjunction with the user origin 704 may be used to determine a designation vector 708. The designation vector 708 provides a direction and a magnitude and may be defined relative to the user origin 704 and the gestural terminus 504. The magnitude may be proportionate to a distance between the user origin 704 and the gestural terminus 504. For example, the user 402 may point to a stack of objects 406 starting with arm midway extended, and extend the arm out to maximum reach to indicate selection of the object 406 deepest in the stack.

The gestural terminus 504 may also include an orientation 710. In some implementations, the orientation of the user's hand in space may alter the orientation of the gestural terminus 710. For example, the user pointing with their index finger and palm down may be one orientation while pointing with the index finger and palm up may be another. In some implementations, this orientation may alter the magnitude of the designation vector. For example, the orientation 710 with the index finger extended and palm down may select the closest side of object, or closest object such as a selected object 712. As described above, particular objects or portions of objects may be selected or indicated by gestures. These objects may be virtual or tangible. Once selected, an object or portion thereof may initiate a function, be designated for further processing, and so forth.

The selected object 712 or portion thereof is that which corresponds to the designation vector 708. For example, as shown here, the correspondence is indicated by the intersection of the designation vector 708 and the object. Unselected objects such as one in the foreground 714(1) do not intersect the designation vector 708. Unselected objects in the background 714(2) are also not intersected by the designation vector 708. As described above, the user may "push" through by moving the gestural terminus 504 relative to the user origin 704, altering orientation 710 of the gestural terminus, and so forth to modify the magnitude of the designation vector 708. For example, a two-dimensional display 404 may present a representation of three-dimensional objects. By the user rotating a hand to place the palm up, the magnitude of the designation vector 708 may be increased to select the previously unselected background object 714(2) while leaving the foreground object 712 unselected. Similarly, in a three-dimensional display such as an auto stereoscopic projection or a volumetric display, the user may select objects at varying depth based at least in part on changing the magnitude of the designation vector 708.

In some implementations, the augmented reality environment may be configured to visually or audibly indicate the object or portion thereof which has been selected. For example, where the object is a physical object, the projector 206 may be configured to present a visual indicator such as a glowing ring that is projected around the object indicating selection. Where the object is a virtual object such as presented on screen or projected on a wall, the object or portion thereof selected may be indicated by a cursor or other visual indicator. In other instances, an ARFN may audibly state the name of the object that the system believes the user has selected. For instance, in response to a user selecting a chair with a particular gesture, the ARFN may state the term "chair" over the speakers, allowing the user to confirm or deny the system's interpretation of the gesture.

The designation vector 708 may thus extend through at least a portion of the object to designate a portion of the object non-visible to the user or to other objects which are non-visible to the user. For example, the user may thus select the opposite side of a three-dimensional object or select a user interface screen which is present "under" several other overlapping screens.

In some, but not all implementations, the designation vector 708 may be determined at least in part by the gaze direction 408 as well as the position of the gestural terminus. For example, where the gaze direction 408 is coincident with the line extending from the user origin 704 through the gestural terminus 504, the designation vector 708 may be considered to have a high degree of accuracy as to what the user intends to select.

Figure 8:
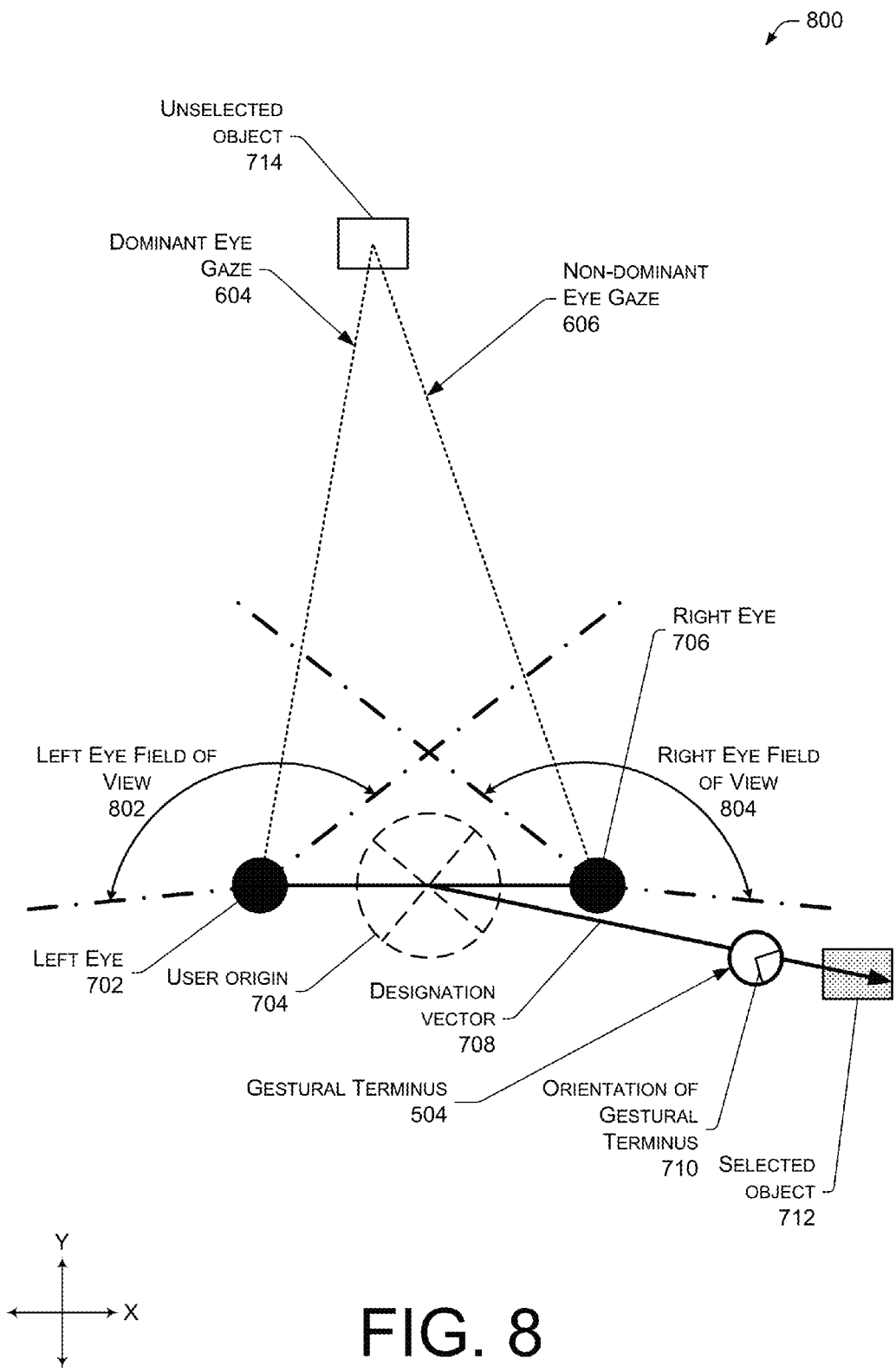
FIG. 8 is a plan-view illustration of the derived posture of a user and selection of a particular object that is outside of the user's field of view.

FIG. 8 is a plan-view illustration 800 of the derived posture of a user and selection of a particular object which is outside of the user's field of view. Each eye has a particular field of view, which describes a solid angle within which an image of the scene is formed. This field of view is limited by the shape of the user's lenses in their eyes, presence or absence of corrective lenses, facial structure, retinal health, and so forth. The fields of view of the left and right eyes generally overlap, but do not do so completely. A healthy user typically has a field of central or foveal vision as well as peripheral vision which exists around the outer edges of each eye's field of view. This illustration depicts a left eye field of view 802 and a right eye field of view 804.

Users may make gestures which are outside of their field of vision. Consider a virtual object which provides a user interface for playing back music. A user may find the music distracting, select the virtual object with a gesture, and with a gesture drag it around and behind them and thus outside of their field of vision. The environment recognizes this gesture and correspondingly moves the presentation of that virtual object to that extreme position and as previously instructed, stops the playback of the audio.

When the gestural terminus 504 is outside of the field of view of the dominant eye or both eyes as shown here, the user origin 704 may be placed at a pre-determined point. This point may remain with the dominant eye, or as shown here, move. For example, as shown here, the user origin 704 has been placed at a midpoint between the user's eyes. The designation vector 708 extends from the user origin 704 towards the gestural terminus 504.

As described above, the orientation of the gestural terminus 710 may be used to modify the magnitude of the designation vector 708. As shown here, the orientation 710 is such that the far side of the object 712 has been selected.

Figure 9:
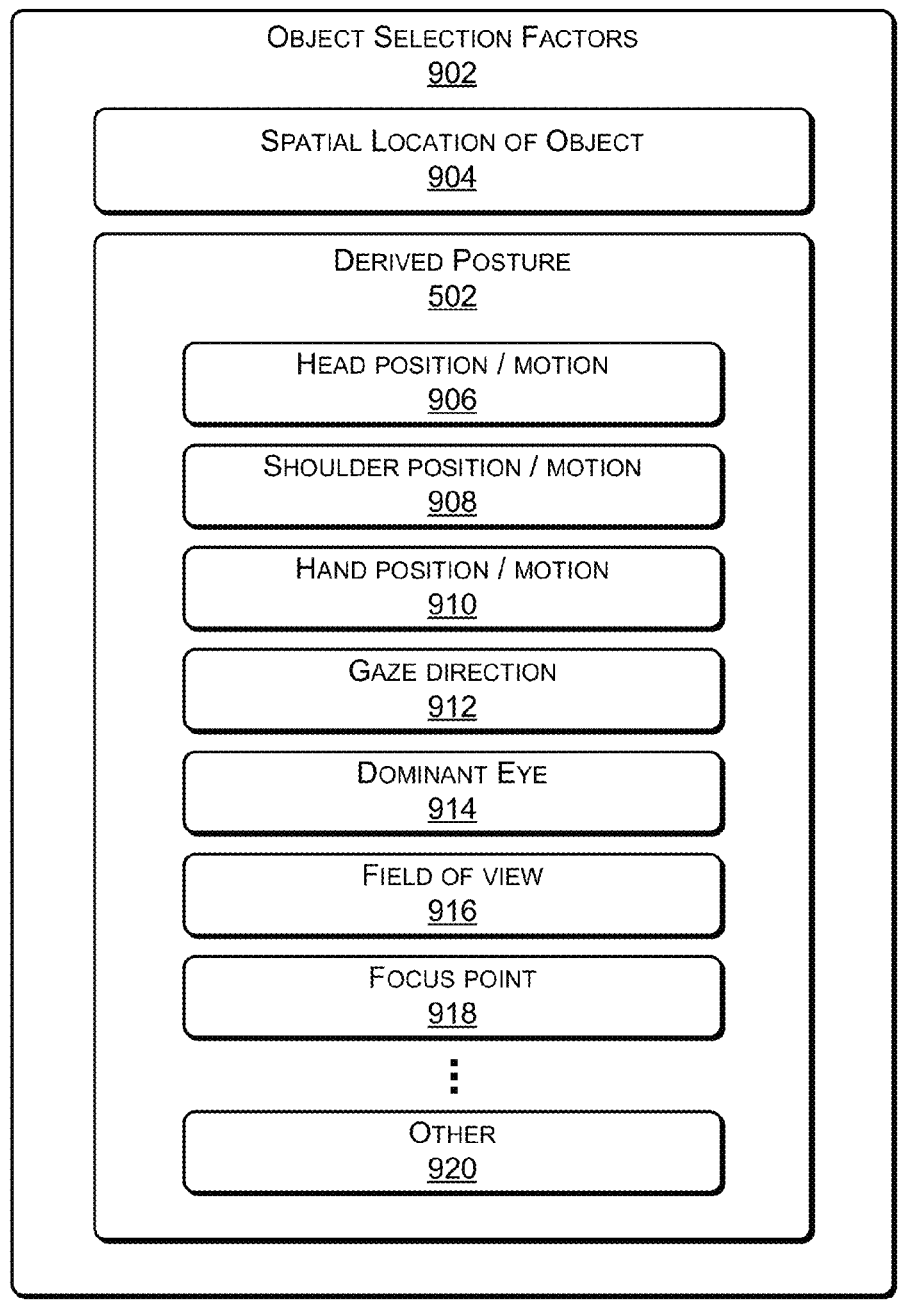
FIG. 9 illustrates object selection factors.

FIG. 9 illustrates object selection factors 902. As described above, the selection of an object or portion thereof is determined by the intersection of the object with the designation vector 708.

To determine whether the designation vector 708 intersects an object, the environment determines a spatial location of the object 904 (e.g., in X-Y-Z space). As described above, this spatial location may be determined using structured light, time delay of arrival, machine vision systems, LIDAR, and so forth. Where the object is virtual and presented via a display device, the spatial location may be determined by calculation using factors such as known position of the projection or display, address within the image, and so forth. In some implementations the image may include a watermark or other encoded signal allowing for direct determination of the physical location of the presented image.

As described above, the derived posture 502 comprises a model of the user's physical arrangement. From the derived posture 502, the gestural terminus 504, user origin 704, and forth may be determined.

The derived posture 502 may include information about head position/motion 906. For example, is the user facing forwards, or turning his head to one side. In some implementations the field of view may be determined based upon the head position/motion 906. The derived posture 502 may designate the position of a portion of the user's body at a given instant of time, motion over a pre-determined interval, or a combination thereof. For example, the motion of a hand moving or a shoulder shrug may comprise a gesture.

Shoulder position/motion 908 may be part of the derived posture 502. Hand position/motion 910 may be included in the derived posture 502. For example, as discussed above the orientation of the user's hand may change the gestural orientation 710.

Aspects of the user's visual system may be included in the derived posture 502 such as a gaze direction 912 indicating direction of the user's central vision. This gaze may comprise orientation or directionality of one or both eyes. As discussed above, a dominant eye 914 may be considered, as well as field of view 916. A focus point 918 may be determined which indicates a distance at which the user's eye or eyes are focused. For example, the user may be focused on an object that is five meters from the user. The derived posture 502 may take into account other factors 920 such as hand dominance, physical disability, foot position/motion, torso position/motion, and so forth.

Illustrative Processes

The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 10:
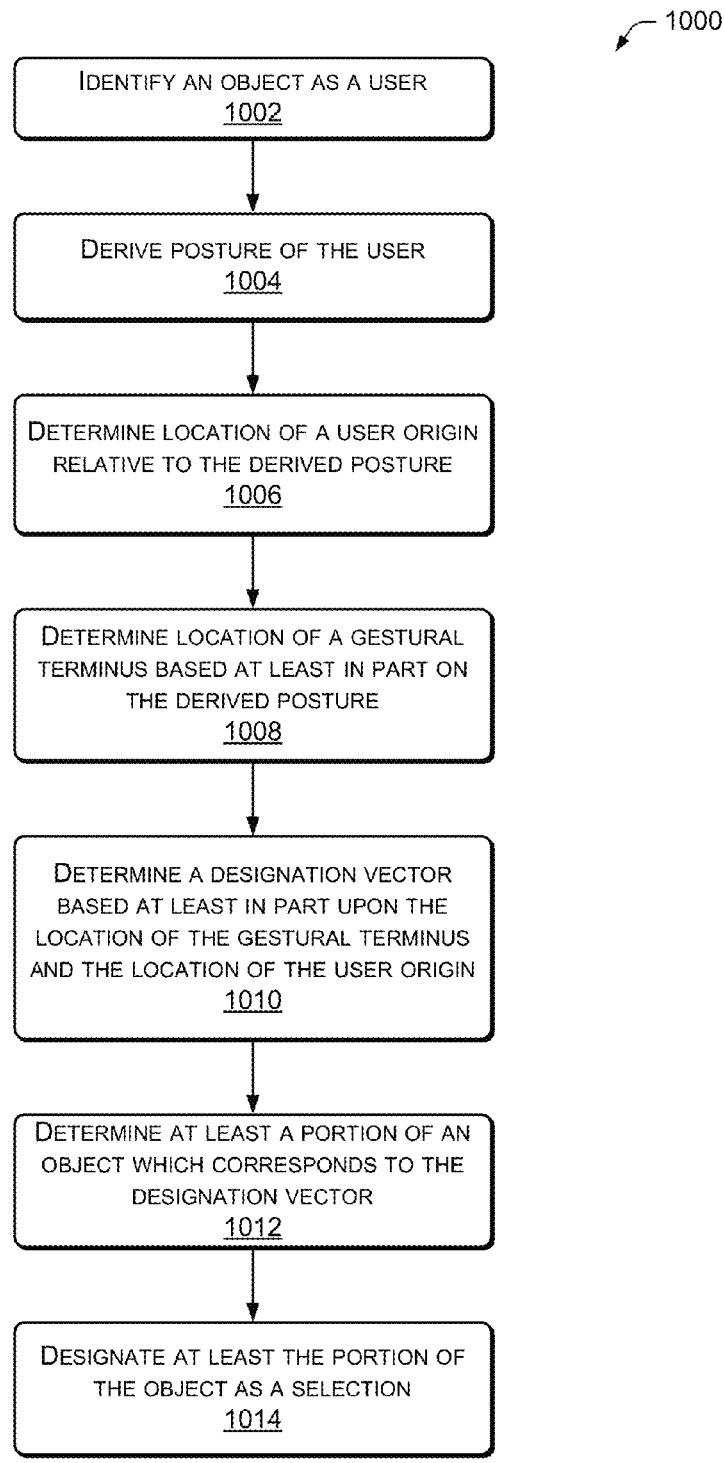
FIG. 10 is an illustrative process of determining a selected object based at least in part upon a gesture.

FIG. 10 is an illustrative process 1000 of determining a selected object based at least in part upon a gesture. This gesture may be free from contact with another object, such as made in space. At 1002, an object is identified as a human user in the augmented reality environment. For example, the camera 210 may recognize the face of the user as a human face, or the microphone 218 may recognize a sound from a particular location as a human voice.

At 1004, a posture of the user is derived. For example, the posture module 122 may use data from the spatial analysis module 114 to generate the derived posture 502. This derived posture may be a model comprising the relative position of the user origin 704 and the gestural terminus 504 such as directly measured by sensors in the augmented reality environment. In some implementations a more detailed anatomically-based model may be constructed, such as illustrated at 502.

At 1006, a location of a user origin is determined relative to the derived posture. For example, the dominant eye of the user may be designated as the user origin 704.

At 1008, a location of one or more gestural termini is determined based at least in part on the derived posture. For example, the tip of an extended finger of an extended hand may be designated as a gestural terminus 504.

At 1010, the designation vector 708 may be determined based at least in part upon the location of the user origin 704 and the location of the gestural terminus 504. As mentioned above with regards to FIG. 9, in some implementations the designation vector 708 may comprise motion of the gestural terminus 504, such as a direction in which a user is moving a hand where the hand is the gestural terminus 504.

At 1012, at least a portion of the object which corresponds to the designation vector 708 is determined. For example, this correspondence may be indicated by an endpoint of the designation vector 708 intersecting a particular portion of the object as determined by the selection module 124.

At 1014, at least a portion of the object corresponding to the designation vector 708 is designated as a selection. For example, the selection module 124 may generate data for use by the environment indicating that the far side of the virtual object has been selected, allowing further manipulation of that object. This manipulation may include designating for further functions, illuminating with the projector, changing presentation of a virtual object, displaying information or functions associated with the object, and so forth.

Figure 11:
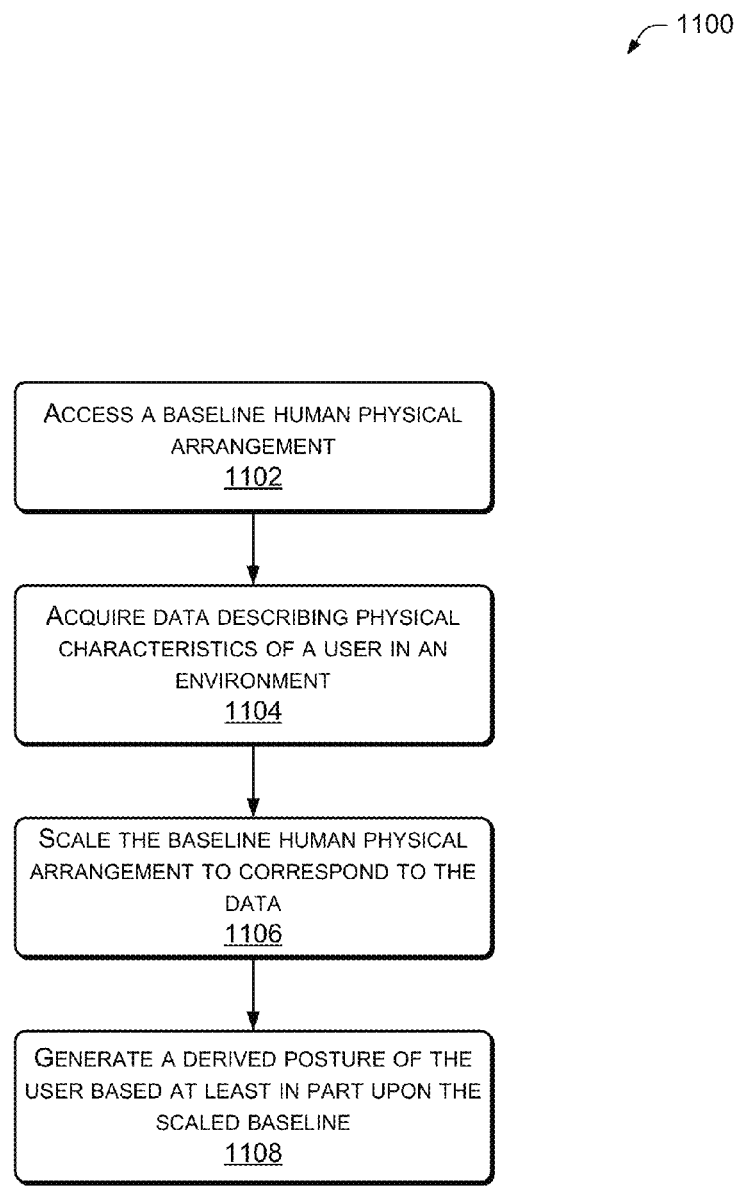
FIG. 11 is an illustrative process of deriving a posture.

FIG. 11 is an illustrative process 1100 of deriving a posture. As mentioned above, the posture may be derived from data acquired in the augmented reality environment, such as from sensors of the ARFN 102. This derived posture may comprise a more detailed anatomical model containing a plurality of segments, such as illustrated at 502 and described next.

At 1102, a baseline human physical arrangement is accessed. This baseline human physical arrangement may contain basic physiological data such as a human generally has two eyes, two arms, two legs, is bilaterally symmetrical, bipedal, and that joints have particular ranges of motion. A library of baselines may be stored to account for various different body types.

At 1104, data is acquired describing physical characteristics of a particular user in the environment. For example, the user's height, arm length, finger size, and so forth may be measured using structured light generated and acquired by the ARFN 102.

At 1106, the baseline human physical arrangement is scaled to correspond to the data. For example, the baseline may be scaled to reflect the user's actual height, actual arm length, and so forth. In some implementations this scaling may be made using a subset of available measurements. For example, given a user's overall height and the distance from their elbow to finger tip, assumptions may be made about other physical elements reducing or eliminating the need to measure or acquire data such as the length of the user's lower leg. The baseline may also reflect a standard or reference position, such as the user standing, facing forward, arms extended to the sides.

At 1108, a derived posture of the user is generated, based at least in part upon the scaled baseline. For example, the baseline may have been scaled to reflect the size of the actual user, and the position of the joints adjusted to reflect the actual position of the user. As mentioned above, the derived posture 504 may be used to designate a user origin 704, determine the gestural terminus 504, and so forth.

Figure 12:
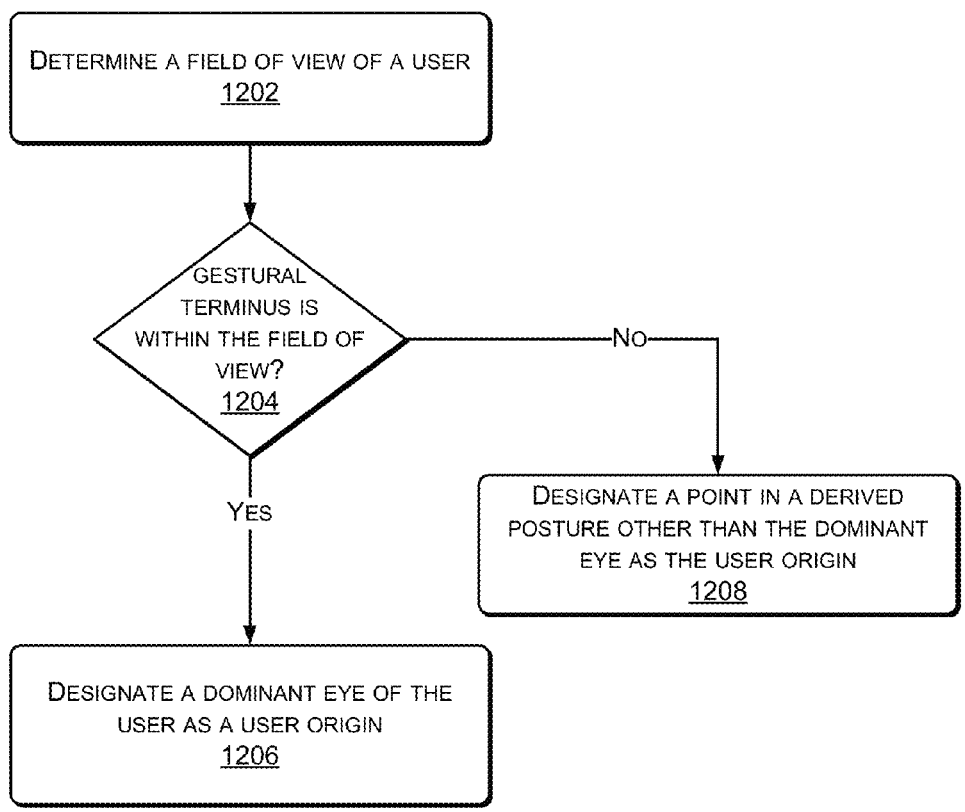
FIG. 12 is an illustrative process of determining a user origin.

FIG. 12 is an illustrative process 1200 of determining the user origin 704. The user origin 704 may be statically defined, such as a particular point within the derived posture 502, or it may be dynamic and vary location depending upon the derived posture 502 or other factors in the environment.

In some implementations such as described in this figure, the user origin 704 may vary in location. At 1202, a field of view of a user is determined. In some implementations the field of view may be pre-determined such as provided by the human baseline described above with regards to FIG. 11. In other implementations, the field of view may be determined by presenting visual stimuli at known positions relative to the user and determining the user's reaction thereto. The field of view may be for one or both eyes.

At 1204, a determination is made as to when the gestural terminus 504 is within the field of view. When the gestural terminus 504 is within the field of view, the process may proceed to 1206. At 1206, the dominant eye of the user may be designated as the user origin 704. When at 1184 the gestural terminus 504 is outside of the user's field of view, the process proceeds to 1208.

At 1208, a point in the derived posture 502 other than the dominant eye is designated as the user origin 704. For example, a point midway between the user's eyes or the position of a shoulder associated with a dominant hand may be designated as the user origin.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a processor;
   a projector coupled to the processor and configured to generate structured light within an environment;
   a camera coupled to the processor and configured to capture at least a portion of the structured light within the environment;
   memory, accessible by the processor;
   a spatial analysis module stored in the memory and configured to generate spatial data about one or more objects within the environment; and
   a tracking and control module stored in the memory and configured to:
      identify an object within the environment as a user based at least in part upon the spatial data;
      derive a posture of the user based at least in part upon the spatial data;
      determine a physical location of a user origin associated with the user relative to the posture of the user;
      determine a location of a gestural terminus of the user based at least in part on the posture of the user;
      determine a designation vector based at least in part upon the physical location of the user origin and the location of the gestural terminus, a magnitude of the designation vector being proportionate to a distance between the physical location of the user origin and the location of the gestural terminus;
      determine a portion of a representation of a second object that corresponds to the designation vector; and
      designate the portion of the representation of the second object as a selection made by the user.

2. The system of claim 1, wherein the designation vector comprises a vector passing through the physical location of the user origin and the location of the gestural terminus.

3. The system of claim 1, wherein the determining the at least the portion of the representation of the second object corresponding to the designation vector comprises determining that the designation vector passes through the at least the portion of the representation of the second object.

4. The system of claim 1, wherein the posture of the user comprises a model of relative positions and orientation of at least a portion of the user's anatomy.

5. The system of claim 1, wherein the posture comprises a model of relative positions of the user's head, eyes, and hands.

6. The system of claim 5, wherein the posture further comprises a model of orientation of the user's head, eyes, and hands.

7. The system of claim 1, wherein the physical location of the user origin is proximate to or coincident with a dominant eye of the user.

8. The system of claim 1, wherein the gestural terminus comprises one or more fingertips of the user.

9. The system of claim 1, wherein the gestural terminus comprises a point on a third object, held by a hand of the user, the point of the third object being distal to the hand of the user.

10. The system of claim 1, wherein the selection made by the user corresponds to the orientation of the gestural terminus.

11. The system of claim 1, wherein the object comprises a virtual object presented via one or more display devices.

12. The system of claim 1, wherein the object comprises a virtual object presented via the projector.

13. The system of claim 1, wherein the object comprises a tangible object.

14. One or more non-transitory computer-readable storage media storing computer-executable instructions that, when executed, cause one or more processors to perform acts comprising:
   receiving data about a user and one or more objects within an environment, the data being generated based in part on one or more images of the environment captured by a camera that is separate and spaced from the user;
   deriving, based at least in part upon the data, a posture of the user in the environment;
   determining a physical location of a user origin associated with the user relative to the posture of the user;
   determining a location of a gestural terminus of the user based at least in part on the posture of the user;
   determining a designation vector based at least in part upon the physical location of the user origin and the location of the gestural terminus, the designation vector including a magnitude that is proportionate to a distance between the physical location of the user origin and the location of the gestural terminus; and
   determining at least a portion of a representation of an object of the one or more objects within the environment that corresponds to the designation vector.

15. The one or more non-transitory computer-readable storage media of claim 14, wherein the designation vector comprises a vector passing through the physical location of the user origin and the location of the gestural terminus.

16. The one or more non-transitory computer-readable storage media of claim 14, wherein the determining the at least the portion of the representation of the object corresponding to the designation vector comprises determining that the designation vector passes through the at least the portion of the representation of the object.

17. The one or more non-transitory computer-readable storage media of claim 14, wherein the deriving the posture of the user comprises determining a dominant eye of the user.

18. The one or more non-transitory computer-readable storage media of claim 17, wherein the determining the dominant eye of the user comprises presenting a calibration object at a known location.

19. The one or more non-transitory computer-readable storage media of claim 14, wherein the deriving the posture of the user comprises:
   accessing a baseline human physical arrangement;
   acquiring characteristic data describing one or more physical characteristics of the user in the environment;
   scaling the baseline human physical arrangement to correspond to the characteristic data to generate a scaled baseline human physical arrangement; and
   generating the posture of the user based at least in part upon the scaled baseline human physical arrangement.

20. The one or more non-transitory computer-readable storage media of claim 14, wherein the determining the physical location of the user origin comprises designating a dominant eye of the user as the user origin based at least partly on a determination that the gestural terminus is within a field of view of the user.

21. The one or more non-transitory computer-readable storage media of claim 14, wherein the determining the physical location of the user origin comprises designating a point in the posture of the user other than the dominant eye as the user origin based at least partly on a determination that the gestural terminus is outside a field of view of the user.

22. The one or more non-transitory computer-readable storage media of claim 14, wherein the designation vector extends through the at least the portion of the object to designate a second portion of the object that is non-visible to the user.

23. The one or more non-transitory computer-readable storage media of claim 14, wherein the gestural terminus encompasses one or more fingertips.

24. One or more non-transitory computer-readable storage media storing computer-executable instructions that, when executed, cause one or more processors to perform acts comprising:
   receiving data about a user and one or more objects within an environment, the data being generated based in part on one or more images of the environment captured by a camera that is separate and spaced from the user;
   determining, based at least in part upon the data, a location of a user origin of the user within the environment, the user origin comprising a reference point associated with an anatomy of the user;
   determining a location of a gestural terminus within the environment, the gestural terminus comprising one or more spatial points associated with a gesturing appendage of the user;
   determining a designation vector based at least in part upon the location of the user origin of the user and the location of the gestural terminus of the user, a magnitude of the designation vector being proportionate to a distance between the location of the user origin and the location of the gestural terminus; and
   determining at least a portion of a physical object that corresponds to the designation vector and that is determined to be selected by the user.

25. The one or more non-transitory computer-readable storage media of claim 24, wherein the location of the user origin comprises a dominant eye of the user.

26. The one or more non-transitory computer-readable storage media of claim 24, wherein the determining the location of the gestural terminus comprises generating a derived posture of the user.

27. The one or more non-transitory computer-readable storage media of claim 24, the acts further comprising selecting the at least the portion of the physical object intersecting the designation vector.

28. The one or more non-transitory computer-readable storage media of claim 27, the acts further comprising selecting the at least the portion of the physical object based at least in part upon an orientation of the gestural terminus.

* * * * *